United States Patent
Bedol et al.

(10) Patent No.: US 10,720,632 B2
(45) Date of Patent: *Jul. 21, 2020

(54) LIQUID POWERED ASSEMBLY

(71) Applicant: Mark A Bedol, Claremont, CA (US)

(72) Inventors: Mark A. Bedol, Claremont, CA (US); Kohar Scott, Hawthorne, CA (US)

(73) Assignee: Mark A. Bedol, Claremont, CA (US)

( * ) Notice: Subject to any disclaimer, the term of this patent is extended or adjusted under 35 U.S.C. 154(b) by 1077 days.

This patent is subject to a terminal disclaimer.

(21) Appl. No.: 14/952,900

(22) Filed: Nov. 25, 2015

(65) Prior Publication Data

US 2016/0079586 A1    Mar. 17, 2016

Related U.S. Application Data

(63) Continuation-in-part of application No. 12/541,432, filed on Aug. 14, 2009, now abandoned.

(51) Int. Cl.
| | | |
|---|---|---|
| *H01M 2/36* | (2006.01) | |
| *H01M 6/32* | (2006.01) | |
| *H01M 4/38* | (2006.01) | |
| *H01M 2/02* | (2006.01) | |

(52) U.S. Cl.
CPC ........... *H01M 2/367* (2013.01); *H01M 2/361* (2013.01); *H01M 6/32* (2013.01); *H01M 2/022* (2013.01); *H01M 4/38* (2013.01); *H01M 2220/30* (2013.01)

(58) Field of Classification Search
CPC .................................. H01M 6/34; H01M 6/32
USPC .................................................. 429/119, 220
See application file for complete search history.

(56) References Cited

U.S. PATENT DOCUMENTS

| | | | | | |
|---|---|---|---|---|---|
| 1,095,188 | A | * | 5/1914 | Busch | .................... G10D 9/026 84/399 |
| 3,352,718 | A | * | 11/1967 | Carson, Jr. | .............. H01M 6/34 429/119 |
| 5,045,170 | A | * | 9/1991 | Bullock | .................... C25B 1/13 204/280 |

(Continued)

FOREIGN PATENT DOCUMENTS

WO    WO2003/034521    *    4/2003    .............. H01M 6/32

OTHER PUBLICATIONS

Ip.Com—WO 2003/034521 A1, English Translation of PCT/FR2002/000813 (Year: 2003).*

*Primary Examiner* — Nina Bhat

(57) ABSTRACT

A liquid powered assembly including a housing; a removable bottom base; a seal; an electrolyte battery assembly; and, a liquid powered device is described. The housing includes an upper end portion and a lower end portion. The housing has a volume for containing an electrolyte solution. The lower end portion has a fluid inlet. The removable bottom base has a bottom surface for supporting the liquid powered assembly. A seal engages the housing and the removable bottom base to help contain the liquid. An electrolyte battery assembly is positioned within the housing. A liquid powered device is operably attached to the electrolyte battery assembly. To function, the housing and the removable bottom base are detached relative to each other and the housing is turned substantially upside down to allow filling of the housing via the inlet. The bottom base is then attached to the housing and the assembly is then inverted for use.

20 Claims, 9 Drawing Sheets

(56) References Cited

U.S. PATENT DOCUMENTS

| | | | | |
|---|---|---|---|---|
| 5,424,147 A * | 6/1995 | Khasin | ............. | H01M 6/34 |
| | | | | 29/623.5 |
| 6,010,799 A * | 1/2000 | Jafri | ............. | H01M 4/06 |
| | | | | 429/118 |
| 6,207,324 B1 * | 3/2001 | Licht | ............. | H01M 4/38 |
| | | | | 429/105 |
| 6,355,369 B1 * | 3/2002 | Iarochenko | ............. | H01M 4/46 |
| | | | | 429/110 |
| 10,379,499 B2 * | 8/2019 | Bedol | ............. | H01M 6/26 |
| 2006/0172186 A1 * | 8/2006 | Tender | ............. | H01M 4/86 |
| | | | | 429/119 |

* cited by examiner

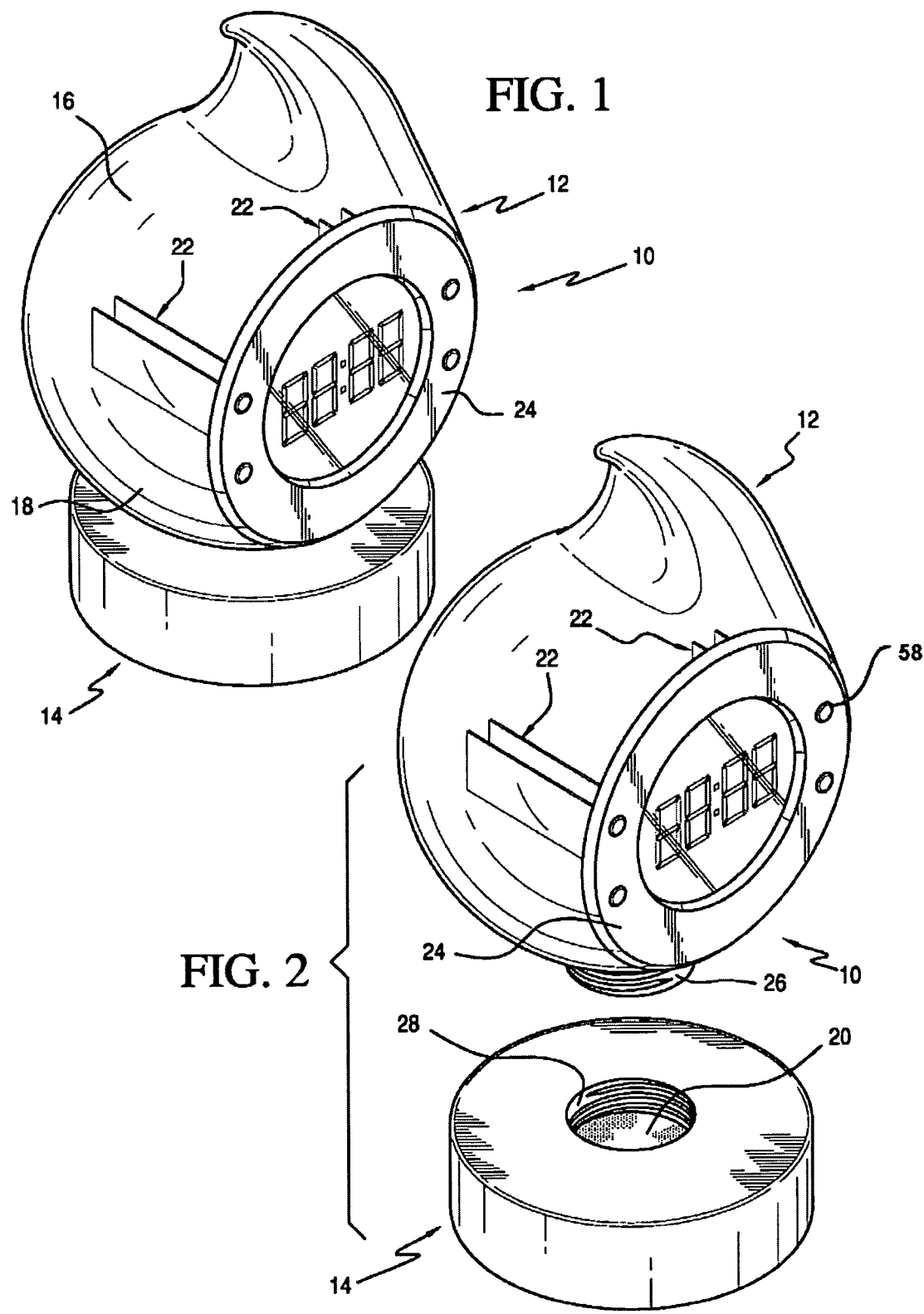

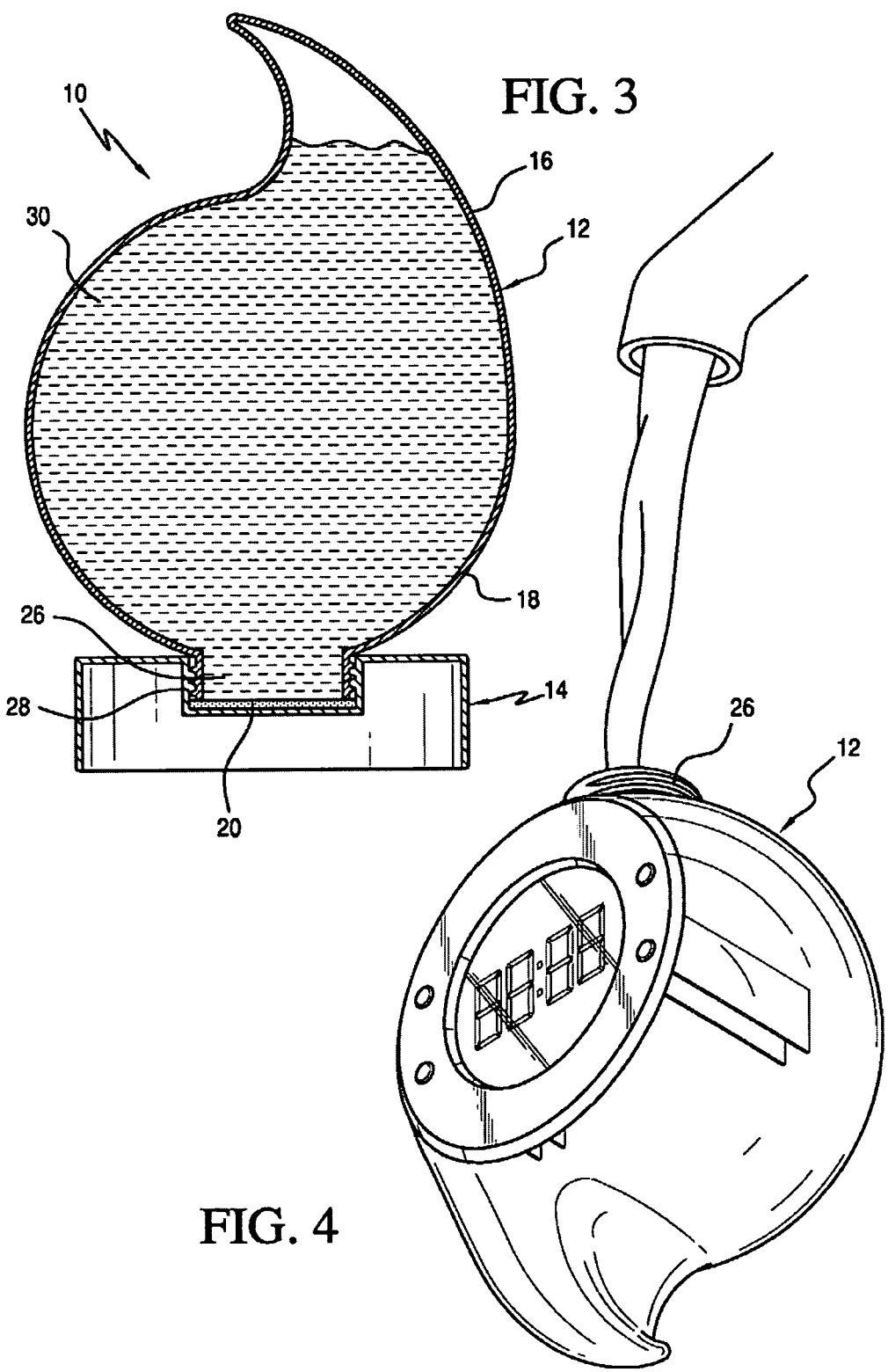

LIQUID POWERED ASSEMBLY

CONTINUITY

This application is a continuation-in-part application of non-provisional patent application Ser. No. 12/541,432, filed on Aug. 14, 2009, and priority is claimed thereto.

FIELD OF THE PRESENT INVENTION

The present invention relates to portable electrolyte powered devices and more particularly to a liquid powered assembly that utilizes a removable bottom base for sealing the housing that contains the electrolyte solution.

BACKGROUND OF THE PRESENT INVENTION

Electrolyte solutions are known in the prior art for providing power to operate very low power consumption devices such as clocks and calculators. For example, Bedol International Group, Inc., Claremont, Calif., distributes a portable "Water Clock" that is operated by an electrolyte solution of water and salt. The Bedol "Water Clock" includes a cap that extends from an upper portion of the housing of the device.

Present applicants are also the inventors of the invention disclosed in U.S. Ser. No. 29/313,579, filed on Jan. 23, 2009, entitled "Clock".

SUMMARY OF THE PRESENT INVENTION

In a broad aspect, the present invention is a liquid powered assembly including a housing; a removable bottom base; a seal; an electrolyte battery assembly; and, a liquid powered device. The housing includes an upper end portion and a lower end portion. The housing has a volume therein for containing an electrolyte solution. The lower end portion has a fluid inlet. The removable bottom base is removably attached to the lower end portion of the housing. The removable bottom base has a bottom surface for supporting the liquid powered assembly. A seal engages the housing and the removable bottom base for providing fluidic sealing engagement therebetween. An electrolyte battery assembly is positioned within the housing. A liquid powered device is operably attached to the electrolyte battery assembly. To provide operation, the housing and the removable bottom base are detached relative to each other and the housing is turned substantially upside down to allow filling of the housing via the inlet. The bottom base is then attached to the housing and the assembly is then inverted for use.

One advantage of the present invention is that in use the filling inlet is disguised. Additionally, the present invention provides enhanced surface area for branding the device or adding other graphical enhancements.

BRIEF DESCRIPTION OF THE DRAWINGS

The present invention will be better understood with reference to the appended drawing sheets, wherein:

FIG. 1 is a perspective view of an alternate embodiment of the liquid powered assembly of the present invention, shown assembled.

FIG. 2 is an exploded perspective view of an alternate embodiment of the liquid powered assembly.

FIG. 3 is a cross-sectional view of an alternate embodiment of the liquid powered assembly in a filled operable state.

FIG. 4 is a perspective view of an alternate embodiment of the liquid powered assembly, shown inverted and being filled for operation.

DETAILED DESCRIPTION OF THE PREFERRED EMBODIMENT

Figure 5:
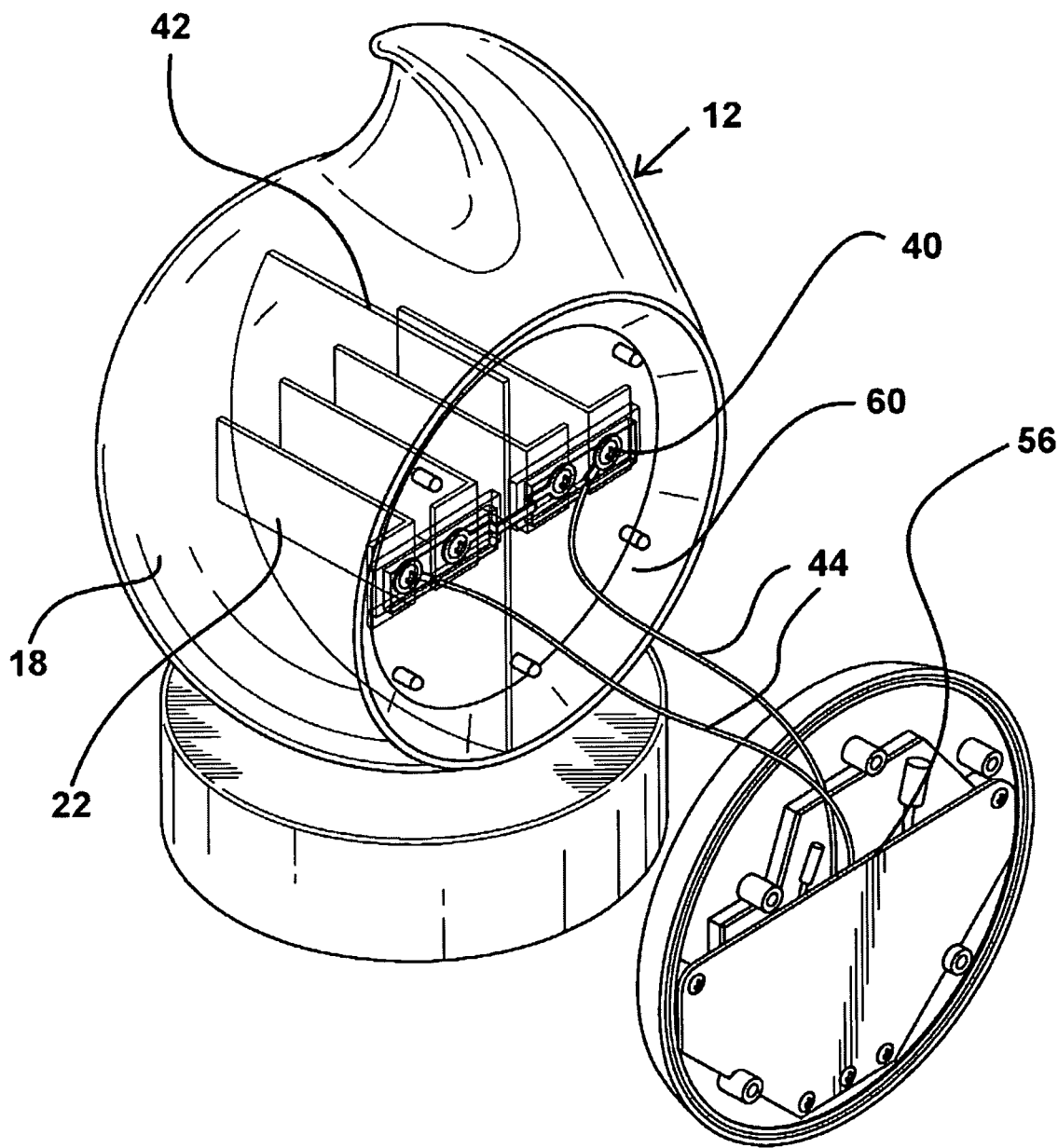
FIG. 5 is a view of the preferred embodiment of the present invention, partially disassembled, as seen from the front.

Referring to the drawings and the characters of reference marked thereon, FIGS. 1 and 2 illustrate the liquid powered assembly, designated generally as (10). The assembly (10) includes a housing (12); and, a removable bottom base (14).

The housing (12) of the present invention preferably includes an upper end portion (16) and a lower end portion (18). The removable bottom base (14) is removably attached to the lower end portion (18) of the housing (12). The removable bottom base 14 has a bottom surface for supporting the liquid powered assembly (10) on a support surface such as a table top or shelf. A seal (20) engages the housing (12) and the removable bottom base (14) for providing fluidic sealing engagement therebetween. An electrolyte battery assembly (22) is positioned within the housing (12). A liquid powered device (24) is operably attached to the electrolyte battery assembly.

The lower end portion (18) of the housing (12) includes a stem (26) defining the fluid inlet. The stem (26) is preferably threaded as shown. The housing (12) may be manufactured in two parts that are bonded together by, for example, ultrasonic welding.

The removable, cylindrical, bottom base (14) has a cavity formed in an upper end thereof. The sides (28) of the cavity contain threads for engaging the threads of the stem (26). The seal (20), i.e. a circular rubber washer, is positioned at the bottom of cavity.

The electrolyte battery assembly (22) preferably comprises two sets of metal rods. Each set includes a brass rod and a zinc rod. During operation, as shown in FIG. 3, the assembly (10) is filled with an electrolyte solution (30) including water with, for example, salt. Thus, electricity is generated as well known by those familiar with these liquid batteries. It should be noted that the housing (12), in an alternative embodiment of the present invention, does not sit directly above base (14)—housing (12) is shown in FIG. 3 sitting directly above base (14). Rather, in the alternative embodiment, lower end portion (18) of the housing (12) sits at an angle where stem (26) is disposed from lower end portion (18). Or in other words, housing (12) is rotated so that upper end portion (16) does not sit directly upright; and stem (26) is longer on one end than on another end of stem (26). Much of the weight of the electrolyte solution (30), as well as the weight of the electrolyte battery assembly (22), sit forward and to one end of the bottom base (14). The uneven disposition of weight causes horizontal pressure on the threads of the stem (26), and the uneven disposition of weight provides additional reinforcement to the water and air tight connection formed between housing (12), seal (20), and bottom base (14).

The liquid powered device (24) may be any number of devices, for example, a clock, calculator, or a light.

To fill the liquid powered assembly (10), the housing it detached from the bottom base. This is easily accomplished. The bottom surface of the bottom base has a diameter in a range of between about 2.5 inches and 3.5 inches, preferably about 3 inches. Therefore, the bottom base is easily manipulated.

The housing (12) is grasped and turned substantially upside down, as shown in FIG. 4. The housing is then filled with an electrolyte solution. The bottom base (14) is then attached to the housing (12) to complete the assembly (10). The assembly (10) is then inverted again so that the base (14) can be placed on a support surface with the upper end portion (16) of the housing (12) positioned to be on top.

The housing (12) of the present invention is envisioned to be water-tight, and the electrodes or metal rod or metal plates 22 are attached to the housing 12 through the housing using an attachment means that can create a strong water-tight seal. Although it is envisioned that other attachment means may be utilized, the preferred method of attachment utilizes a screw, a nut and, a rubber washer (40). The screw and nut can be made of a metal, or may be fashioned of a hard plastic. It is important for the water to be sealed so that it does not enter the chamber (60) where the electronic assembly is housed so that the liquid does not short out the electronic assembly.

Additionally, there is preferably a divider (42) disposed inside of the water tank, which forms two liquid battery cells. Each set of metal rods (22) are made of two opposing plurality of materials. For example one metal rod (22) of copper or brass and one metal rod (22) of Zinc could be used so that there is a power charge generated from the chemical reaction. There is at least one wire (44) that connects the battery system to the electronic assembly (56) located on the back of the face of the clock. A connector (46) is preferably present that connects the two battery cells together in the preferred embodiment of the present invention. The face plate is preferably configured to attach to the front of the housing using a pressure fit attachment means (48).

Figure 6:
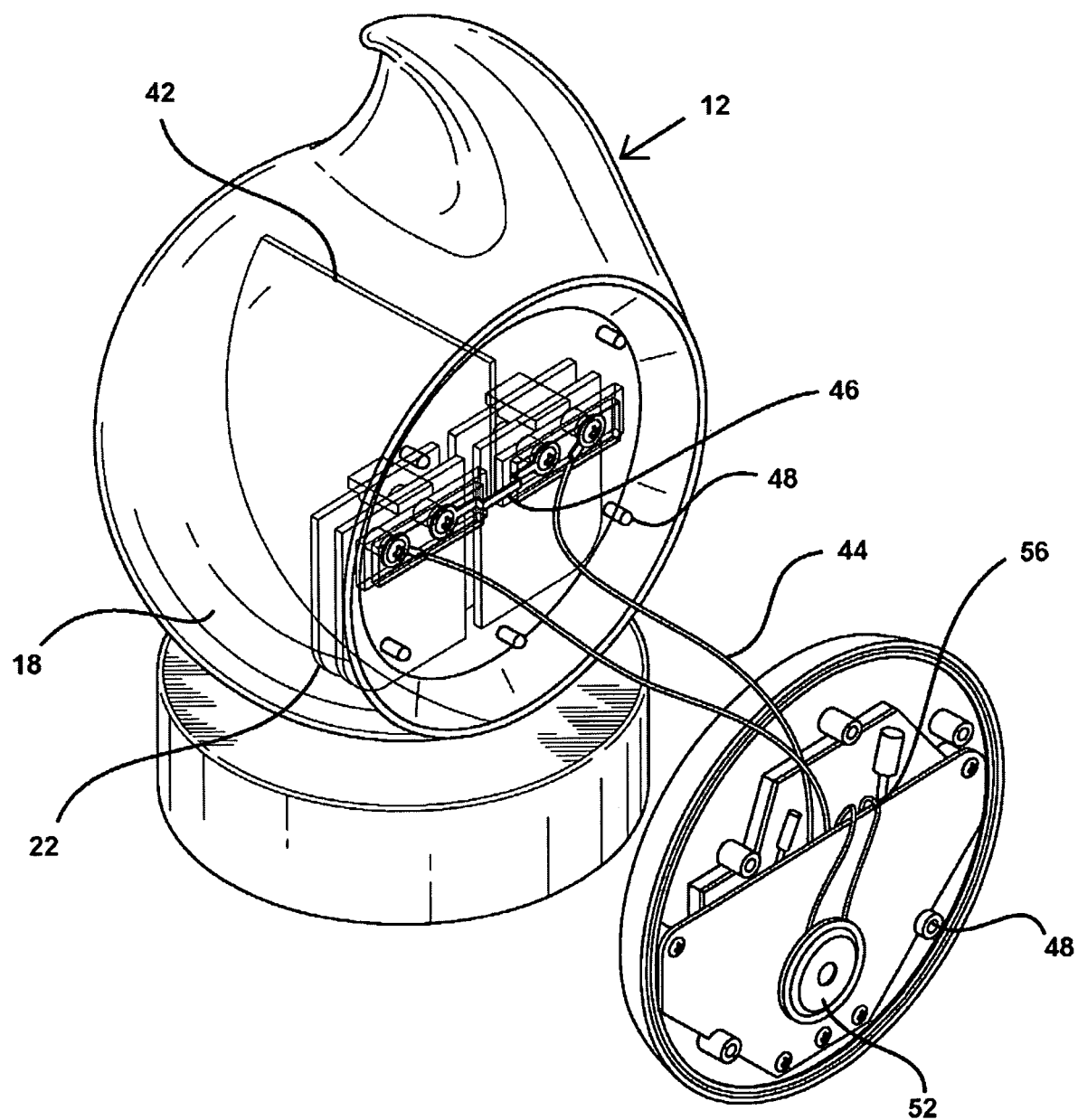
FIG. 6 is a view of an alternate preferred embodiment of the present invention, partially disassembled, as seen from the front.
Figure 7:
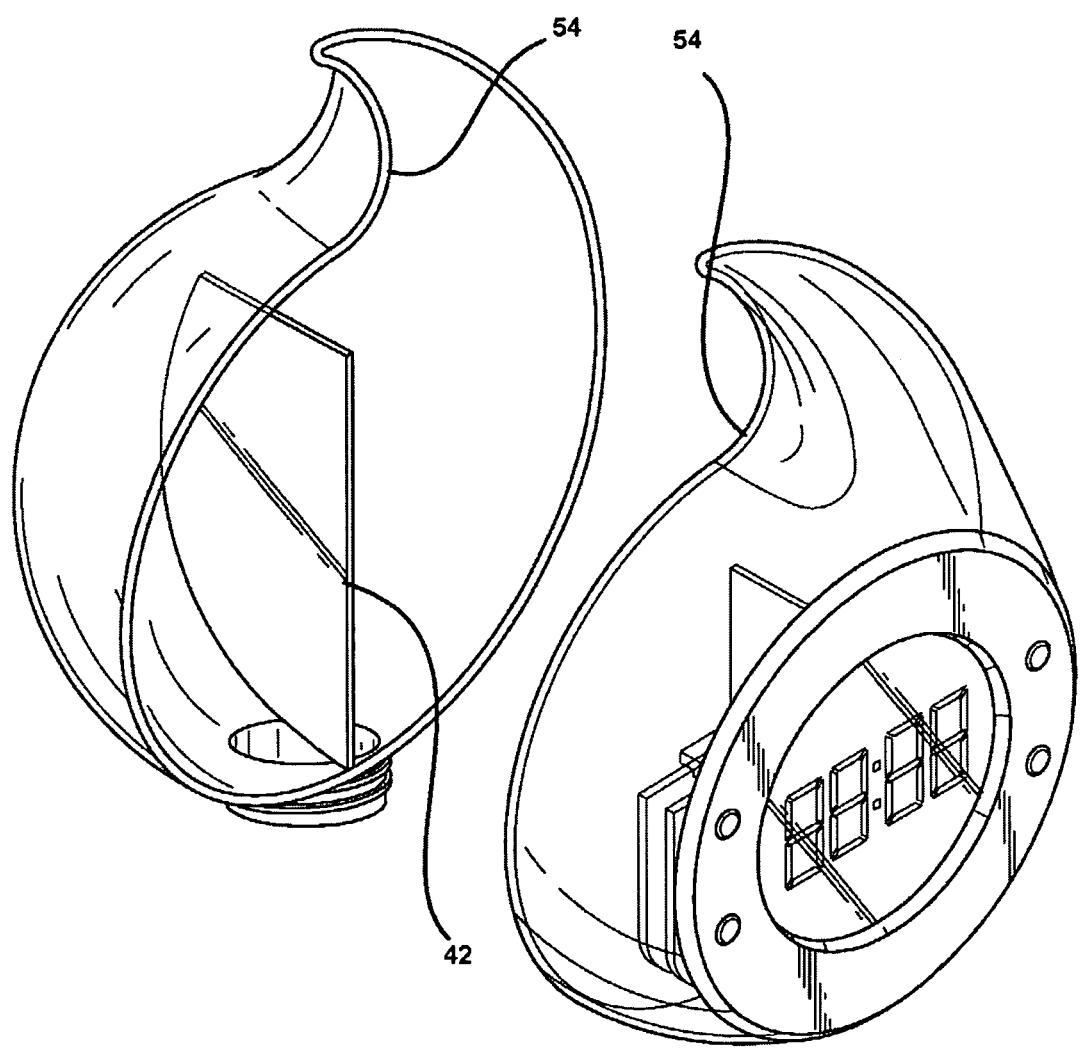
FIG. 7 is a view of the present invention separated in two halves, as seen from the front.
Figure 8:
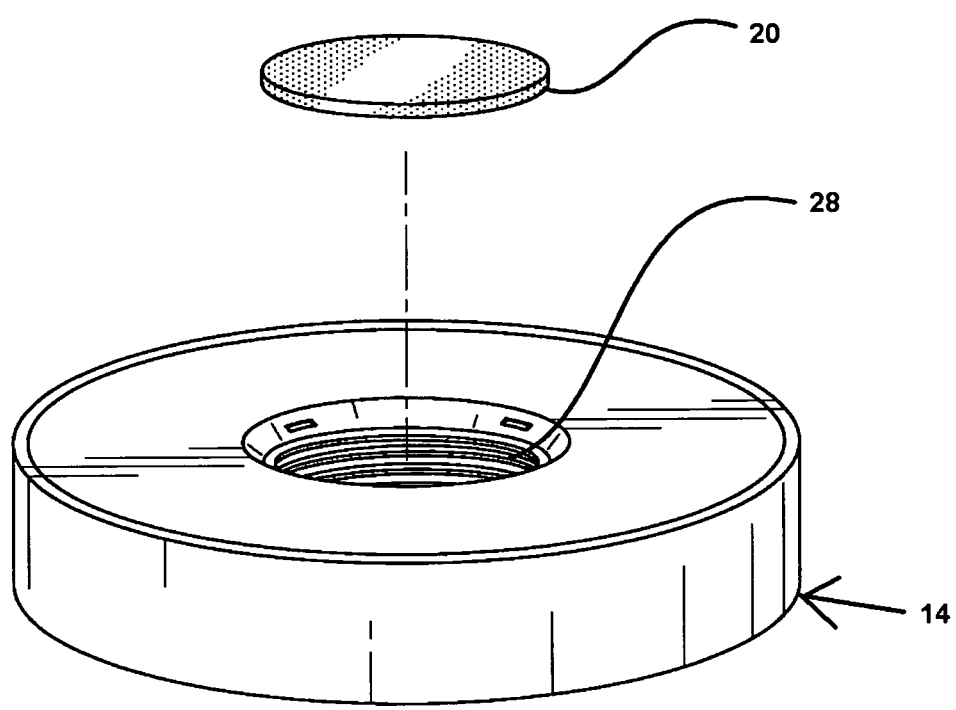
FIG. 8 is a view of the base of the present invention as seen from the front.
Figure 9:
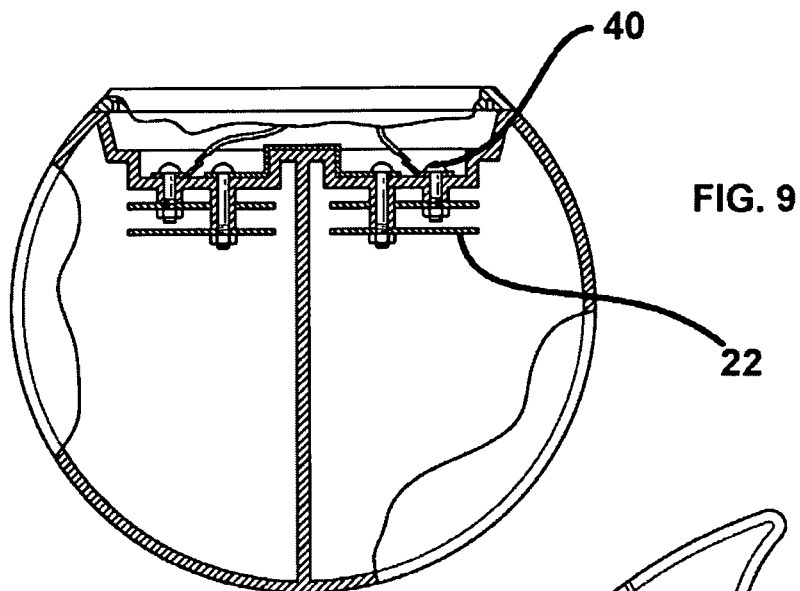
FIG. 9 is a cross-sectional view of the present invention as seen from above.
Figure 10:
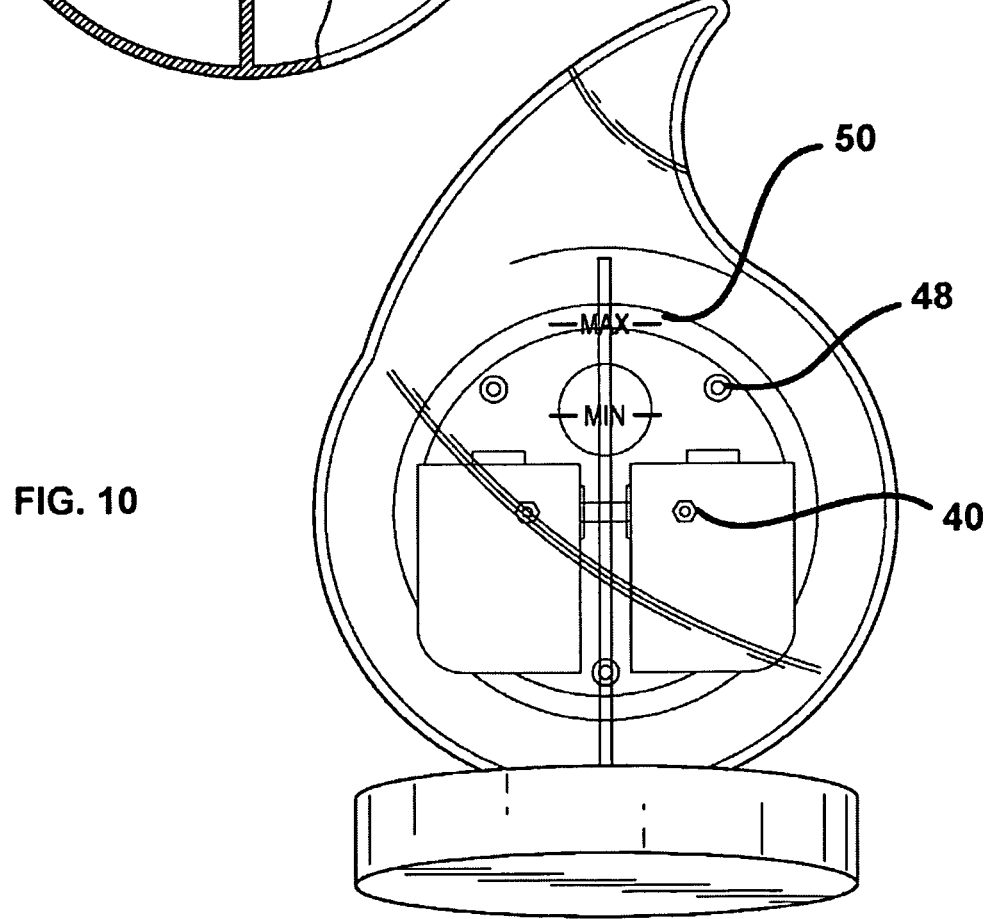
FIG. 10 is a cross-sectional view of the present invention as seen from the rear.
Figure 11:
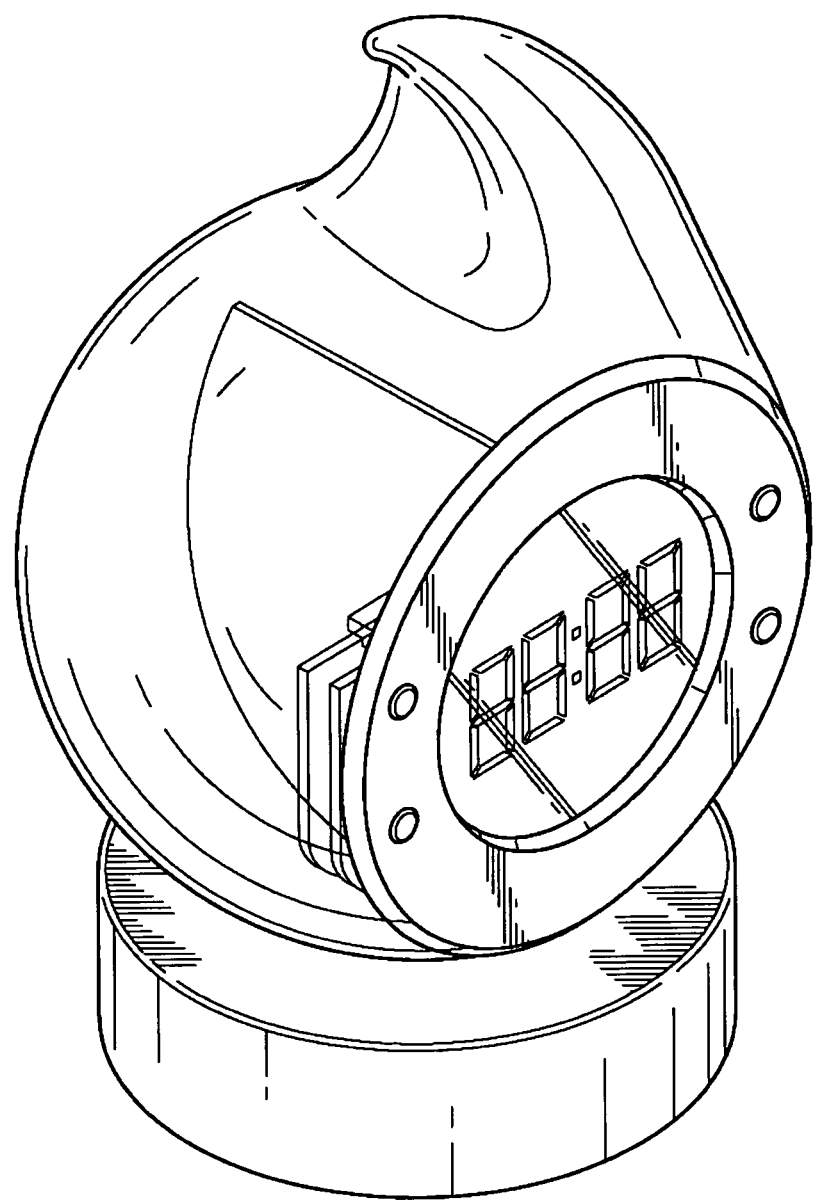
FIG. 11 is an environmental view of the present invention as seen from the front.
Figure 12:
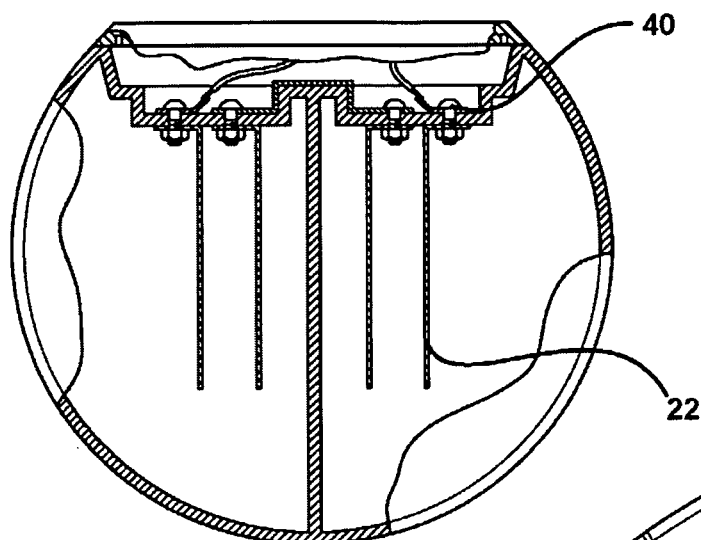
FIG. 12 displays a cross-sectional view of the present invention as seen from above.
Figure 13:
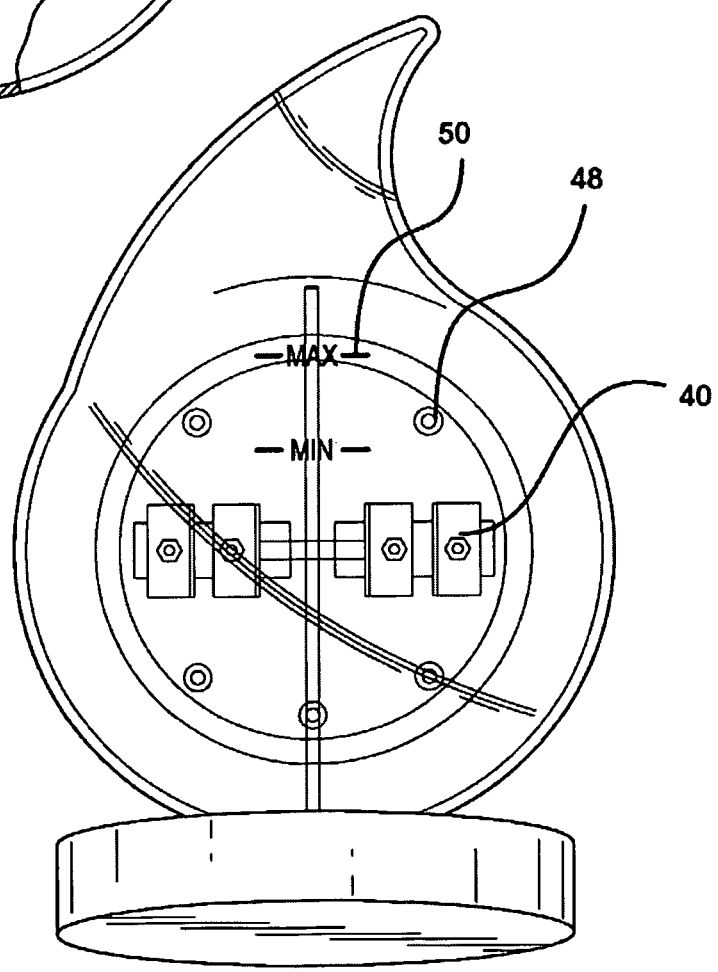
FIG. 13 exhibits a cross-sectional view of the preferred embodiment of the present invention as seen from the rear.

The metal rods (22) can be facing the back of the water tank perpendicular to the clock face shown in FIG. 5, or facing downwards, horizontal to the clock face, as shown in FIG. 6. The preferred distance between the metal rods (22) is between ⅛ of an inch to ½ of an inch.

Additionally, there are markings (50) disposed on the rear of the water tank that indicates the fill level (of liquid) required in order for the liquid battery cell to have air on the top over the filled water. There is a requirement for air to be present in the water tank to allow the reaction to power the clock. The markings (50) help to ensure that the level of liquid is not too high, which can prevent the optional operation of the present invention. In the preferred embodiment of the present invention, the liquid employed is water.

The water of the liquid preferably has a mixture of lemon juice and/or salt to facilitate the reaction.

Additionally, some embodiments of the present invention may be equipped with a buzzer alarm (52) as shown in FIG. 6. The housing (12) is ultrasonically welded or glued (54) using a watertight glue after the metal plates are assembled inside of the housing. It should be noted that FIG. 5 and FIG. 6 shows the face of the clock, including the electronic assembly connected to the metal plates and in a flipped down orientation.

The stem (26) allows the clock to be attached to the base (14) and secured inside of the void in the back 28 using screw attachment means. The base (14) supports the housing (12) and forms a water tight seal using the rubber washer (20) or gasket that is positioned inside of the cap. Additionally, buttons (58) are preferably disposed on the housing (12) as shown, which preferably function to change the time and date of the clock. During initial assembly, the electronics of the present invention, including the two sets of metal rods (22) are mounted on the housing, then the two halves of the housing (12) are ultrasonically or otherwise glued together, ensuring a water-tight seal.

It should be noted that the seal (20) is preferably positioned wholly outside of the housing (12). Additionally, the two sets of metal rods (22) are preferably disposed centrally within the housing (12) holding the water and electrolytes. This ensures that conduction of electricity occurs optimally at two points in the solution. In the preferred embodiment of the present invention, the two sets of metal rods (22) are equipped with a coating which serves to increase the polarity between each of the two sets of metal rods (22), optimizing the creation of voltage when exposed to the liquid. With such a coating on the two sets of metal rods (22), then there is no need for salt or lemon in the liquid, as the coating provides enough polarity to facilitate powering the device. The coating is a conventional polarity booster, but when used in the environment of the present invention, the coating allows the user of the present invention to merely add tap water to the housing for power generation—without the need for salt or lemon additives.

Additionally, the base (14) of the present invention is configured to prevent the present invention from accidentally tipping or falling over, as the present invention is not intended to be tilted or inverted during clock operation. In the preferred embodiment of the present invention, the two sets of metal rods (22) are metal plates configured to act as electrodes.

Similarly, it should be noted that, if the housing of the present invention is filled with water such that the water extends up into the conical shaped top of the housing (12) when the housing is level and attached to the base (14), then too much water is present in the system for optimal functionality. If the level of liquid is this high, electricity will not be generated due to the lack of air within the volume of the housing (12). The conical shaped top of the present invention is configured to act as a visual aid for the user, helping the user to ensure the correct water level for proper use of the present invention. As such, the user should always ensure that no water extends into the conical shaped top when the present invention is disposed in position for use.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A liquid powered assembly, comprising: a housing, having a generally spherical shape, including an upper end portion and a lower end portion, said housing having a volume therein for containing an electrolyte solution, said lower end portion having a fluid inlet disposed off-center of said housing; a removable bottom base removably attached to said lower end portion of said housing, said removable bottom base having a bottom surface for supporting said liquid powered assembly, a stem of said lower end portion of said housing threading into said removable bottom base; wherein said housing sits atop said base; a seal for engaging said housing and said removable bottom base for providing fluidic sealing engagement there between at said fluid inlet, said seal being a disc positioned under said housing and above said removable bottom base; an electrolyte battery assembly positioned within said housing, said electrolyte battery assembly having two sets of metal rods disposed centrally within said housing; a divider, said divider disposed centrally within said housing approaching a top of said upper end portion; wherein said electrolyte solution may pass under said divider within a well cavity of said fluid inlet; a liquid powered device operably attached to said electrolyte battery assembly and positioned at said housing, wherein, to provide operation, said housing and said removable bottom base are detached relative to each other, said housing is turned substantially upside down to allow filling of said liquid inlet and to allow only then a display to be properly read right-side up from the assembly, said bottom base is attached to said housing and said assembly is then inverted for use, thereby disguising said fluid inlet; and wherein said liquid powered device is contained within a water-tight chamber.

2. The apparatus of claim 1, further comprising:
a max-fill line, said max fill line disposed below the top of said divider.

3. A liquid-powered electronic device comprising:
a housing, said housing equipped with a upper end portion and a lower end portion;
a divider, said divider disposed in a center said housing approaching a top of said upper end portion of said housing;
wherein said divider divides said housing into a first chamber and a second chamber;
wherein said housing is water-tight;
a removable bottom base, said removable bottom base is in communication with said lower end portion;
a first set of metal rods;
a second set of metal rods;
wherein said first set of metal rods and said second set of metal rods are electrodes;
wherein said lower end portion has a resealable liquid-tight container;
wherein said resealable liquid-tight container has a cavity;
an electrolyte solution;
wherein said electrolyte solution, said first set of metal rods, and said second set of metal rods are disposed in said cavity;
wherein said cavity is equipped with an inlet opening, said inlet opening disposed in a well which allows flow of said electrolyte solution between said first chamber and said second chamber;
an electronic assembly, said electronic assembly in communication with said electrodes via at least one wire; and
wherein said electronic assembly is powered by said electrolyte solution interacting with said first set of metal rods and said second set of metal rods.

4. The device of claim 3, wherein said electronic assembly is an electronic clock.

5. The device of claim 3, wherein said first set of metal rods, said second set of metal rods, and said electrolyte solution create a charge; and
wherein said first set of metal rods and said second set of metal rods are disposed centrally within said cavity of said housing.

6. The device of claim 3, wherein said electrolyte solution is a water and salt mixture.

7. The device of claim 3, wherein said electrolyte solution is water; and
wherein said first set of metal rods and said second set of metal rods are equipped with a electrolytic coating, increasing the polarity between said first set of metal rods and said second set of metal rods.

8. A liquid powered assembly, comprising:
a liquid tank assembly, said liquid tank assembly having two pieces with one of the pieces having a fluid inlet whereas the other piece does not have a fluid inlet, said liquid tank assembly includes a divider for separating metal elements of each respective set of metal elements, said divider is shorter in length then liquid tank assembly to allow liquid flow between the separate chambers;
a power assembly secured within said liquid tank assembly, said power assembly comprises two sets of metal elements, each set configured to produce an electrolyte charge;
an electronic module assembly secured within said liquid tank assembly; wherein said power assembly is in fluid communication with said fluid inlet to provide filling of said power assembly;
a recessed liquid sealed compartment for securing the electronic module assembly;
an electronic module of said electronic module assembly element operatively connected to an LCD, said electronic module element having a connecting plate operatively connected at a back surface thereof; and
wherein said power assembly includes a pair of conducting screws, said power assembly further comprising two sets of metal elements, each set configured to produce an electrolyte charge, wherein each said conductive screw of an associated set of metal elements is arranged and positioned to conduct electricity from its associated metal element to said connecting plate.

9. The liquid powered assembly of claim 8, wherein said liquid tank assembly is liquid-sealed prevents liquid to flow from said liquid tank assembly when said electronic module is removed.

10. The liquid powered assembly of claim 8, wherein a removable bottom base is removably attached to said lower end portion of said liquid tank assembly, said removable bottom base having a bottom surface for supporting said liquid powered assembly, a stem of said lower end portion of said housing threading into said removable bottom base.

11. The liquid powered assembly of claim 8, wherein a seal for engaging said housing and said removable bottom base for providing fluidic sealing engagement therebetween at said fluid inlet, said seal being a disc positioned under said housing and above said removable bottom base.

12. The liquid powered assembly of claim 8, said housing sits atop said base.

13. The liquid powered assembly of claim 8, wherein said electronic module assembly includes a plurality of set buttons.

14. The liquid powered device of claim 8, wherein said top opening of said divider allows liquid to flow between said chambers.

15. The liquid powered device of claim 8, wherein metal elements are disposed with said liquid tank and are larger than the fluid inlet opening.

16. The apparatus of claim 1, wherein said liquid-powered device is a time-communicating element.

17. The apparatus of claim 8, wherein an exterior of said liquid tank assembly is configured to be affixed to a wall.

18. The apparatus of claim 8, wherein said liquid tank assembly is configured to be worn on a wrist via at least one strap.

19. The apparatus of claim 8, wherein said recessed liquid sealed compartment ensures that the liquid does not contact the electronic module assembly, preventing the electronic module assembly from short-circuiting.

20. The apparatus of claim 8, further comprising:
   a connector, said connector disposed within said electronic module assembly; and
   wherein said connector effectively connects the divided portions of said liquid tank assembly, forming a unitary liquid cell contained in the liquid tank assembly.

* * * * *